US008503525B2

(12) United States Patent
Wang et al.

(10) Patent No.: US 8,503,525 B2
(45) Date of Patent: Aug. 6, 2013

(54) METHOD AND A SYSTEM FOR DETERMINING PREDICTED NUMBERS OF PROCESSOR CYCLES REQUIRED FOR RESPECTIVE SEGMENTS OF A MEDIA FILE FOR PLAYBACK OF THE MEDIA FILE

(75) Inventors: Ye Wang, Singapore (SG); Yicheng Huang, Singapore (SG); Samarjit Chakraborty, Singapore (SG)

(73) Assignee: National University of Singapore, Singapore (SG)

( * ) Notice: Subject to any disclaimer, the term of this patent is extended or adjusted under 35 U.S.C. 154(b) by 1154 days.

(21) Appl. No.: 12/084,443

(22) PCT Filed: Nov. 3, 2006

(86) PCT No.: PCT/SG2006/000326
§ 371 (c)(1),
(2), (4) Date: Aug. 18, 2008

(87) PCT Pub. No.: WO2007/053118
PCT Pub. Date: May 10, 2007

(65) Prior Publication Data
US 2009/0112931 A1 Apr. 30, 2009

Related U.S. Application Data
(60) Provisional application No. 60/733,893, filed on Nov. 4, 2005.

(51) Int. Cl.
*H04N 7/12* (2006.01)
(52) U.S. Cl.
USPC ............. 375/240.12; 375/240.18; 375/240.2; 375/240.23; 375/240.25

(58) Field of Classification Search
USPC .................. 370/240, 240.01, 240.12, 240.18, 370/240.2, 240.23, 240.25; 375/240, 240.01, 375/240.12, 240.16, 240.18, 240.2, 240.23, 375/240.25
See application file for complete search history.

(56) References Cited

U.S. PATENT DOCUMENTS
6,167,092 A 12/2000 Lengwehasatit
6,618,442 B1 * 9/2003 Chen et al. ................. 375/240.2
(Continued)

FOREIGN PATENT DOCUMENTS
WO WO02/085031 A1 10/2002
WO 2004084558 A2 9/2004

OTHER PUBLICATIONS
Raman et al., "Meeting CPU Contraints by Delaying Playout of Multimedia Tasks," Department of Computer Science, National University of Singapore, NOSSDAV'05, Jun. 13-14, 2005, Stevenson, Washington.

(Continued)

*Primary Examiner* — Michael Thier
*Assistant Examiner* — Feben M Haile
(74) *Attorney, Agent, or Firm* — Schwabe, Williamson & Wyatt, P.C.

(57) ABSTRACT

A method of determining predicted numbers of processor cycles required for respective segments of a media file for playback of the media file, a method of playback of a media file, a method of downloading a media file, a device for playback of a media file and a system for downloading a media file. The method comprising performing a bitstream analysis of the media file to determine a number of non-zero IDCT coefficients of the respective segments, input parameters of an MC task function associated with respective segments, or both; and determining the predicted numbers of processor cycles based on the bitstream analysis.

19 Claims, 9 Drawing Sheets

U.S. PATENT DOCUMENTS

| | | | |
|---|---|---|---|
| 7,978,770 B2* | 7/2011 | Luo et al. | 375/240.16 |
| 2002/0154227 A1 | 10/2002 | Lan et al. | |
| 2003/0078952 A1 | 4/2003 | Kim et al. | |
| 2006/0088105 A1* | 4/2006 | Shen et al. | 375/240.21 |
| 2006/0123262 A1 | 6/2006 | Bullman | |

OTHER PUBLICATIONS

Office Action issued May 25, 2010 for Japanese Patent Application No. 2008-539989.

International Search Report for Application PCT/SG2006/000326, mailed on Jan. 4, 2007, 2 pages.

Written Opinion of the International Searching Authority for Application PCT/SG2006/000326, mailed on Jan. 4, 2007, 4 pages.

International Preliminary Report on Patentability for Application PCT/SG2006/000326, mailed on Dec. 11, 2007, 6 pages.

Decision of Rejection issued in Japanese Application 2008-539989, mailed on Sep. 21, 2010, 2 pages.

Office Action, issued in European Patent Application No. 06813106.9, mailed Feb. 14, 2011, 3 pages.

Notice of Allowance, issued in Japanese Patent Application No. 2008-539989, mailed Feb. 22, 2011, 3 pages.

"An adaptive Algoithm for Low-Power Streaming Multimedia Processing", Andrea Acquaviva, Luca Benini, Bruno Ricco, IEEE pp. 273-279, 2001.

"SimpleScalar: An Infrastructure for Computer System Modeling", Todd Austin, Eric Larson, Dan Ernst, IEEE, pp. 59-67, Feb. 2002.

"Frame-Based Dynamic Voltage and Frequency Scaling for an MPEG Player", Kihwan Choi, Wei-Chung Cheng, and Massoud Pedram, pp. 1-15, Dept of EE Systems, University of Southern California.

"Energy-Aware System Design for Wireless Multimedia", Hans Van Antwerpen et al., IEEE, pp. 1-6, 2004.

"Integrated Power Management for Video Streaming to Mobile Handheld Devices", Shivajit Mohapatra et al., Berkley, California, Nov. 2-8, 2003.

"Exploring Efficient Operating Points for Voltage Scaled Embedded Processor Cores", Marcio Buss et al., IEEE, 2003.

"Saving Energy with Architectural and Frequency Adaptations for Multimedia Applications", Christopher J. Hughes, et al., IEEE, pp. 250-261, 2001.

"Feedback-Based Dynamic Voltage and Frequency Scaling for Memory-Bound Real-Time Application", Christian Poellabauer et al., IEEE (RTAS, 2005).

"Optimizing the Data Cache Performance of a Software MPEG-2 Video Decoder", Peter Soderquist, et al., pp. 291-301, ACM Multimedia 97, Seattle, Washington, 1997.

"Energy-Efficient Soft Real-Time CPU Scheduling for Mobile Multimedia Systems", Wanghong Yuan et al., SOSP '03, Oct. 19-22, 2003.

"Practical Voltage Scaling for Mobile Multimedia Devices", Wanghong Yuan et al., MM'04, Oct. 10-16, 2004.

Supplementary Partial European Search Report for EP 06813106, mailed on Dec. 6, 2011.

* cited by examiner

METHOD AND A SYSTEM FOR DETERMINING PREDICTED NUMBERS OF PROCESSOR CYCLES REQUIRED FOR RESPECTIVE SEGMENTS OF A MEDIA FILE FOR PLAYBACK OF THE MEDIA FILE

CROSS-REFERENCE TO RELATED APPLICATIONS

The present application is a U.S. National Stage of International Patent Application No. PCT/SG2006/000326, filed Nov. 3, 2006, entitled "A METHOD AND A SYSTEM FOR DETERMINING PREDICTED NUMBERS OF PROCESSOR CYCLES REQUIRED FOR RESPECTIVE SEGMENTS OF A MEDIA FILE FOR PLAYBACK OF THE MEDIA FILE," which claims priority to U.S. Provisional Application US 60/733,893, filed Nov. 4, 2005, entitled "USING OFFLINE BITSTREAM ANALYSIS FOR POWER-AWARE VIDEO DECODING IN PORTABLE DEVICES," the entire disclosures of which are hereby incorporated by reference in their entirety.

FIELD OF INVENTION

The present invention relates broadly to a method of determining predicted numbers of processor cycles required for respective segments of a media file for playback of the media file, a method of playback of a media file, a method of downloading a media file, a device for playback of a media file and a system for downloading a media file.

BACKGROUND

Energy efficiency is one of the most critical issues in the design of battery-powered portable devices such as mobile phones, personal digital assistants (PDAs) and audio/video players. The predominant workload running on most of these devices is now generated by multimedia processing applications, e.g. audio/video decoders. This has resulted in a considerable interest in power management schemes for portable devices running multimedia applications. To improve on energy savings of these portable devices, two main techniques, i.e. dynamic voltage scaling (DVS) and dynamic power management (DPM), have been developed over the last couple of years. DVS relies on changing the frequency and voltage of the processor at runtime to match the workload demand generated by an application while DPM-based techniques rely on switching off parts of a device, e.g. processor, hard disk, display, at runtime based on their usage.

Typically, multimedia applications exhibit a high degree of data-dependent variability in their execution requirements. For example, the ratio of the maximum and the average workload generated by an MPEG decoder application may be as high as a factor of 10. In addition, there may also be other types of variability such as the variability in the input-output rates of an application. For example, the variable length decoding task in an MPEG decoder consumes a variable number of bits corresponding to each compressed macroblock that is generated. In the case of multimedia applications, many DVS-based techniques exploit this variability to scale the voltage and frequency of the processor at runtime to match the changing workload. As a result, two broad classes of techniques have been developed.

The first class of techniques relies on control-theoretic feedback techniques to predict the future workload based on the recent past workload. One main disadvantage of this class of techniques is that they are computationally expensive and are difficult to implement because the voltage of the processor needs to be frequently changed at runtime. Further, it is difficult to give performance and quality-of-service guarantees based on these techniques because the predictions might be wrong occasionally.

The second class of techniques attempt to statically characterize the bounds on the variability and use these bounds at runtime. Although this allows for quality-of-service guarantees, such static characterizations usually do not lead to useful energy savings.

Therefore, there is a need to provide a technique or scheme that seeks to address at least one of the above-mentioned problems.

SUMMARY

In accordance with a first aspect of the present invention, there is provided A method of determining predicted numbers of processor cycles required for respective segments of a media file for playback of the media file, the method comprising performing a bitstream analysis of the media file to determine a number of non-zero IDCT coefficients of the respective segments, input parameters of an MC task function associated with respective segments, or both; and determining the predicted numbers of processor cycles based on the bitstream analysis.

The method may comprise calculating predicted numbers of VLD task cycles for the respective segments from the number of non-zero IDCT coefficients.

The predicted numbers of VLD task cycles for the respective segments may be calculated using a substantially linear relationship.

The method may comprise calculating predicted numbers of MC task cycles for the respective segments based on the input parameters of the MC task function.

The method may comprise providing a table of simulated MC task cycle numbers for execution of the MC task function for all possible input parameter values, and calculating the predicted numbers of MC task cycles for the respective segments based on data parsed from the respective segments and the table of simulated MC tasks.

The method may further comprise utilizing a constant number of processor IDCT cycles for an IDCT task in determining the predicted numbers of processor cycles.

The segments may comprise macroblocks, slices, or frames of the media file.

The method may comprise summing up the predicted numbers of VLD task cycles, the predicted numbers of MC task cycles and the numbers of processor IDCT cycles for determining the predicted numbers of processor cycles required for respective segments of the media file for playback of the media file.

The method may comprise adding a predetermined buffer cycle number to the sum of the predicted numbers of VLD task cycles, the predicted numbers of MC task cycles and the numbers of processor IDCT cycles to determine the predicted numbers of processor cycles required for respective segments of the media file for playback of the media file.

In accordance with a second aspect of the present invention, there is provided a method of playback of a media file, the method comprising varying a frequency and a voltage of a processor during the playback of the media file, wherein the varying is based on a method of determining predicted numbers of processor cycles required for respective segments of the media file for playback of the media file.

In accordance with a third aspect of the present invention, there is provided a method of downloading a media file, the method comprising adding metadata to the media file, wherein the metadata comprises determined predicted numbers of processor cycles required for respective segments of the media file for playback of the media file based on a number of non-zero IDCT coefficients of the respective segments, input parameters of an MC task function associated with respective segments, or both.

In accordance with a fourth aspect of the present invention, there is provided a device for playback of a media file, the device comprising a processor scalable in voltage, frequency, or both; a database for storing data representing a media file, wherein the media file comprises metadata; a controller for controlling a frequency and a voltage during playback of the media file based on the metadata.

In accordance with a fifth aspect of the present invention, there is provided a system for downloading a media file, the system comprising: a source device comprising a media file; a destination device to which the media file is to be downloaded; and a processor unit for generating metadata comprising determined predicted numbers of processor cycles required for respective segments of the media file for playback of the media file based on a number of non-zero IDCT coefficients of the respective segments, input parameters of an MC task function associated with respective segments, or both, and for adding the metadata to the media file for downloading onto the destination device.

The processor unit may be integrated in the source device or the destination device.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
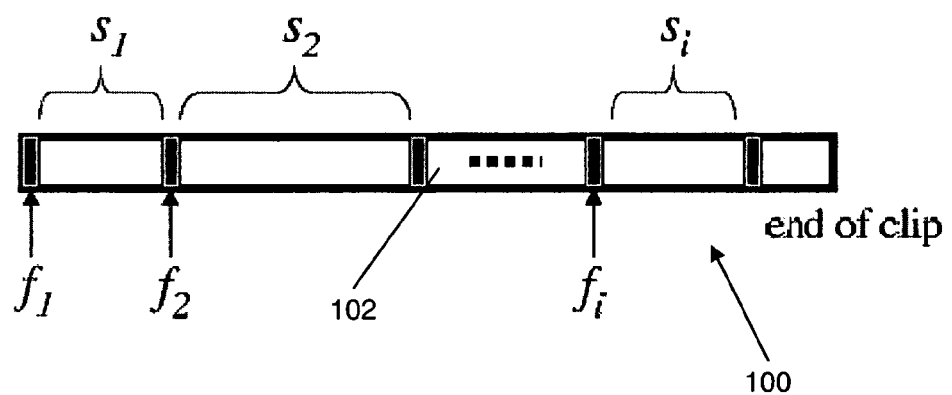
FIG. 1 shows an illustration of a video clip with the inserted metadata.

The described dynamic voltage scaling (DVS) scheme in the context of multimedia applications is very general and can be applied to both, other types of video, and audio processing applications. However, only video decoding is described in the following. The scheme relies on an offline bitstream analysis of a video clip to predict the workload that will be generated while decoding the clip.

Based on the above analysis, metadata information is inserted into the video clip or is saved as a separate file. At runtime, the decoder reads this metadata information and controls the voltage and frequency of the processor. The metadata information will typically consist of the frequency at which the processor needs to be run at any point in time. The metadata can also consist of workload information such as processor cycle demands from which the required processor frequency is computed at runtime. The amount of metadata that needs to be inserted depends on the granularity, or how often the frequency of the processor needs to be changed. If the amount of metadata allowed is large, higher amounts of energy can be saved.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "decoding", "analyzing", "simulating", "determining", "encoding", "predicting", "processing", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the preferred method.

FIG. 1 shows an illustration of a video clip 100 with the inserted metadata 102. The metadata 102 comprises the frequency with which the processor needs to be run, i.e. frequency $f_1$ for the segment of the video clip $s_1$, frequency $f_2$ for the segment of the clip $s_2$, and so on. The decoder is assumed to be specially designed to read the metadata information in addition to the original video data. The decoder reads the metadata and changes the processor frequency at appropriate times.

A person skilled in the art will appreciate that all the existing techniques predict at runtime the processor frequency $f_i$ with which the segment $s_i$ needs to be decoded without looking into the segment $s_i$. In contrast, the described scheme performs an offline analysis of the compressed bitstream corresponding to $s_i$ and inserts the metadata $f_i$. The runtime system then simply reads $f_i$ and sets the processor frequency to this value. It is not necessary for the metadata information to be equally spaced out within the video clip. If the computational workload of a clip is highly variable and irregular, more metadata is preferably required. When certain portions of the clip do not exhibit any variation, the processor can run at a constant frequency and this constant frequency value only needs to be inserted once. The inserted metadata information consists of frequency as well as voltage values, depending on the type of processor used.

There are several methods of inserting the metadata information. One method is to insert the metadata information directly during the encoding process. However, this method assumes that the details of the decoder and the processor on which the decoder would run are already known at the time of encoding. It would also amount to generating video clips which can only be played on certain devices or on devices manufactured by the same company, which are all based on the same or on similar processor architectures. Thus, it is a very restrictive method.

A scheme where the metadata information is directly inserted into a video clip based on the architecture of the portable device is described herein. It is assumed that to download a video file into the portable device, the device would be connected to e.g. a desktop computer on which an application program specialized for this device would run. The program would perform a bitstream analysis of the video file being downloaded, calculate the appropriate metadata information and insert this information into the file. Since the program is specialized for the device, the metadata computed is specific to its processor architecture and the decoder application running on the device. Thus, each device would have an application program that is specific to the device. This scheme has two main advantages. Firstly; it is flexible, i.e. the portable device can play video files encoded in standard formats such as MPEG-2. The metadata-inserted files are not "visible" to the external world as they only exist inside the portable device. Secondly, the bitstream analysis process can be run on e.g. the desktop computer instead of on the portable device, which is typically resource constrained.

Further, there are various methods for computing the exact values of the metadata for the video file. The exact values of the metadata inserted depend on the architecture of the processor, e.g. its instruction set architecture, voltage/frequency range and the steps in which they can be changed, and also on the decoder application running on this processor. The person skilled in the art will appreciate that one method is to simulate the decoding of the given video file on a software model of the processor's architecture. This would result in a trace of the file's processor cycle requirements, e.g. the number of processor cycles required to decode each macroblock of the video file. From this trace, the clock frequency with which the processor should be run while decoding any segment of the file can be computed. The computed frequencies will constitute the metadata information to be inserted into the video file. It would be possible to use processor instruction set simulators like SimpleScalar to compute the trace of processor cycle requirements of a video file. However, a cycle-accurate simulation of the execution of a processor is extremely expensive in terms of the simulation time involved. For example, simulating the decoding of a 30 seconds long MPEG-2 video clip requires more than half an hour using SimpleScalar. Hence, this method is not preferred if the metadata computation needs to be done while downloading a video file from a desktop computer into a portable device.

The scheme described herein does not require simulation of the execution/decoding of the video clip. Instead, a bitstream analysis to predict the processor cycle requirements of each macroblock is performed. In contrast to the described analysis, existing runtime prediction schemes predict the processor cycle requirement of a video segment without looking into the segment. The described scheme allows for the bitstream analysis, i.e. looking into segments of the video file, because it is done offline while the video file is being downloaded into the device. This scheme is based on classifying the video decoding tasks into two groups, i.e. those that are CPU-bound such as motion compensation, and those which are memory-bound such as those responsible for dithering. The processor cycle requirements of memory-bound tasks are almost constant and are hence easy to predict. Hence, only details of predicting the processor cycle requirements of CPU-bound tasks are described in the following. MPEG-2 is used for illustration in the following description. As appreciated by the person skilled in the art, e.g. MPEG-4 can also be used.

An MPEG-2 video sequence is made up of a number of frames, where each frame contains several slices. Each slice consists of a number of macroblocks (MBs). Decoding an MPEG2 video can therefore be considered as decoding a sequence of MBs. This involves executing the following tasks for each MB, namely variable length decoding (VLD), inverse discrete cosine transformation (IDCT) and motion compensation (MC). Other tasks such as inverse quantization (IQ) involve a negligible amount of computational workload. Hence, these tasks are not taken into account for the bitstream analysis. The analysis presented below can be used for voltage/frequency scaling at the MB granularity. It will be appreciated by a person skilled in the art that the same analysis can be used at the slice or frame granularity. Given a sequence of MBs, details on how to predict the processor cycle requirements corresponding to the tasks VLD, IDCT and MC for each of these MBs are described in the following.

The predicted results from the scheme as described will be compared with those obtained from simulating the execution of these tasks using the SimpleScalar instruction set simulator with the Sim-Profile configuration and with the same sequence of MBs as input. A RISC processor without any MPEG-specific instructions is used. Test Model 5 (TM5) is used as the MPEG-2 decoder application. Although it is not an optimized decoder, it is acceptable for the analysis since all MPEG-2 decoders have a similar code structure. Five different video clips encoded with a bitrate of about 4M/s are used for the experiments: (a) Flwr (has moderate motion), (b) Tennis (still background with moving foreground), (c) Susi (very low motion), (d) V700 (still image) and (e) Football (very fast motion).

Details of predicting the processor cycle requirements corresponding to the VLD task are described herein. The IDCT coefficients in MPEG-2 are encoded using variable length encoding, which involves Run-Length Coding followed by Huffman Coding. Some run-length codes are coded using longer Huffman codes as compared to the others. The number of processor cycles required for the Huffman decoding depends on the length of the Huffman codes used. Therefore, the inventors have recognised that the number of processor cycles required by the VLD task for any input MB is expected to depend on the number of non-zero IDCT coefficients in it. The simulations verify this deduction and the relationship between the number of processor cycles and the number of non-zero IDCT coefficients is found to be a linear one.

FIGS. 2(a)-(e) show plots of the number of processor cycles required by the VLD task against different number of non-zero IDCT coefficients in a MB for the five respective MPEG-2 video clips (a) to (e) above. Each of these plots consists of two distinct linear bands, where the upper band 202 results from large MBs which involve extra I/O operations. The large MBs are negligible since they constitute less than 1% of the total number of MBs in a clip. A straight line is fitted on the lower band 204 using least squares fitting. The resulting function derived from the straight line as an estimate of the number of processor cycles required by the VLD task for any MB. The function is $n_{vid} = a \times n_{coef} + b$, where $n_{vid}$ is the estimated number of processor cycles, $n_{coef}$ is the number of non-zero coefficients in the MB and a and b are constants which depend on the processor architecture and the VLD code. From the experimental results, the values of a and b are determined to be 140 and 3000 respectively.

FIG. 2(f) shows a plot of a percentage of MBs against the prediction error in processor cycles resulting from this function for the Flwr video clip. The other four clips have similar error distributions. For around 36% of the MBs, the prediction error for the processor cycle requirements was less than about 2%. The prediction error was less than about 10% for all MBs in the range of about −1000 to about +2000 processor cycles.

Details of predicting the processor cycle requirements corresponding to the MC task are described herein. MBs constituting an MPEG-2 clip are classified into three categories: those involving no motion compensation (I-type), those involving only forward motion compensation (P-type) and those involving both forward and backward motion compensation (B-type). The MC task for P-type MBs incur about half the number of processor cycles compared to B-type MBs and I-type MBs do not incur any computational workload.

FIG. 3(a)-(e) shows plots of a percentage of MBs against number of processor cycles obtained from SimpleScalar simulations for motion compensation (MC) task for of the five MPEG-2 video clips. From FIGS. 3(a)-(c) and 3(e), the number of processor cycles for the four respective clips (a)-(c) and (e) are distributed into three distinct clusters. The first cluster 302, which is about 0 processor cycles, corresponds to the I-type MBs, the second cluster 304, which is about 3000-7000 cycles, corresponds to the P-type MBs, and the third cluster 306, which is about 9000-17000 cycles, corresponds to the B-type MBs. From FIG. 3(d), it is observed that almost all the MBs use the same type of motion compensation, resulting in a single cluster as the V700 clip (d) is a still image.

Since the processor cycle distribution within each cluster is reasonably large, a prediction solely based on MB type will not be accurate enough. The variability within each cluster results from factors like whether the MC task is frame- or field-based and whether the motion vectors are half- or one-pixel accurate.

The code for the MC task is considered to be composed of a number of subroutines, each of which is essentially the same function, but called with different parameters. Let this function be denoted by F. The number of processor cycles required to execute F depends only on its input parameters. Depending on the input MB, these parameters include (i) Y component's x-dimension is HALF-PIXEL, (ii) Y component's y-dimension is HALF-PIXEL, (iii) U or V component's x-dimension is HALFPIXEL, (iv) U or V component's y-dimension is HALF-PIXEL, (v) forward or backward motion compensation is required, and (vi) the motion compensation window size is 16×8 or 16×16. Different MBs call F different number of times and with different values of the above boolean parameters. For example, a P-type non-progressively coded MB, which uses frame-based motion compensation, will call F twice. Both of these calls are with the same list of parameters (0, 0, 0, 0, 1, 16×8). Similarly, a B-type, progressively coded MB, which uses field-based motion compensation, will also call F twice, but with the parameters (1, 1, 1, 1, 1, 16×16) and (1, 1, 1, 1, 0, 16×16).

Figure 3:
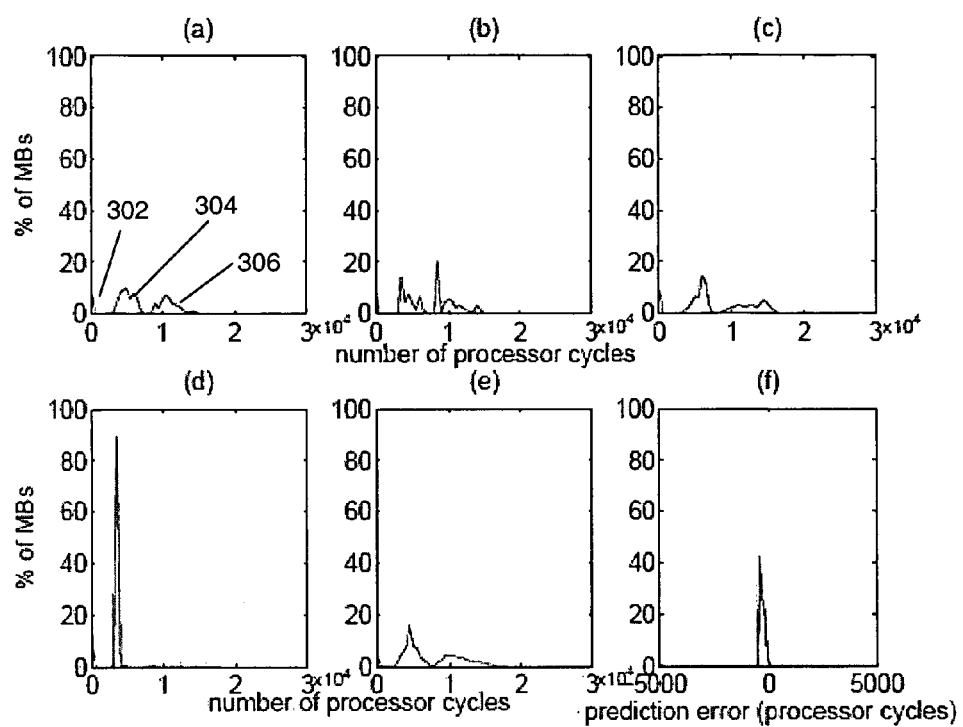
FIG. 3(a)-(e) shows plots of a percentage of MBs against number of processor cycles obtained from SimpleScalar simulations for motion compensation (MC) task for each of five video clips.
FIG. 3(f) shows a plot of a percentage of MBs against prediction error in the number of processor cycles for MC task.

Based on the above observations, the inventors have recognised that the processor cycle requirement of the MC task can be predicted by first simulating the execution of F with all possible input parameter values. Since there are six boolean parameters, there will be a total of $2^6 = 64$ possible input values. The processor cycle requirement of F corresponding to each of these 64 possible inputs is stored in a table. Given a sequence of MBs, the number of times F is called and with what input parameter values F is called can be determined by parsing each MB. Using these and the precomputed table of cycle requirements, the cycle requirements for each of the MBs can be predicted. The error distribution resulting from this prediction scheme is shown in FIG. 3(f). FIG. 3(f) shows a plot of a percentage of MBs against prediction error in the number of processor cycles. For approximately 40% of the MBs, the error incurred is less than about 2%. Further, none of the MBs incur an error of more than about 4%.

Details of predicting the processor cycle requirements corresponding to the IDCT task are described herein. Each MB in MPEG-2 contains four Y blocks, one U block and one V block. Each of these blocks are of 8×8 pixels size. Hence, the input data size to the IDCT task is the same for all MBs, which results in the same computational workload being incurred for all MBs. An optimized implementation of the IDCT task may take into account that several IDCT coefficients might be zero and exploit this fact to save some computation. Nevertheless, the inventors have recognised that it can be assumed in the described scheme that the number of processor cycles incurred by the IDCT task for any MB is a constant. This is verified by the experimental results shown in FIGS. 4(a)-(e). FIG. 4(a)-(e) shows plots of percentage of MBs against number of processor cycles for inverse diverse cosine transformation (IDCT) task for the respective five video clips (a) to (e) above.

Figure 4:
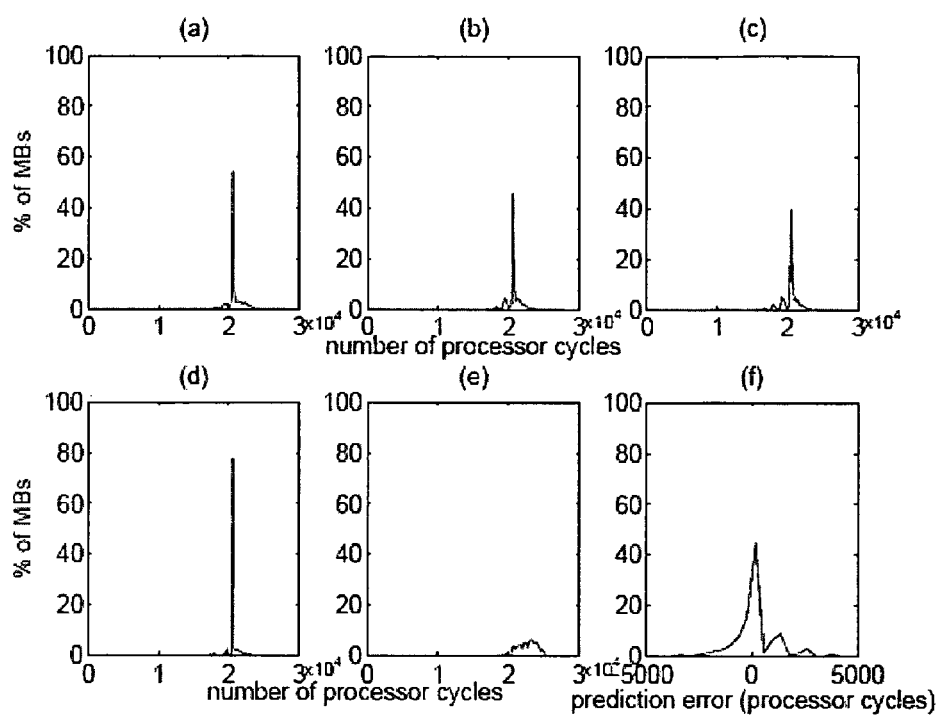
FIG. 4(a)-(e) shows plots of a percentage of MBs against number of processor cycles for inverse diverse cosine transformation (IDCT) task.
FIG. 4(f) shows a plot of a percentage of MBs against prediction error in the number of processor cycles for IDCT task.

Since the variation around the processor cycle requirement of $2\times10^4$ cycles results from the optimized IDCT implementation, $2\times10^4+4000$ is selected as the processor cycle requirement for any macroblock from the results. 4000 cycles is added as a safety margin with the described example. The error distribution resulting from this prediction is shown in FIG. 4(f). FIG. 4(f) shows a plot of a percentage of MBs against prediction error in the number of processor cycles. Around 61% of the MBs incur an error of less than about 2% and about 91% of the MBs incur an error of less than about 10%.

The total number of processor cycles required to decode a MB is obtained by summing up the predicted values for the VLD, MC and IDCT tasks and adding a safety margin of 500 cycles with the described example. The value of the safety margin is obtained from simulations and varies according to the processor architecture and the decoder code.

To evaluate the effectiveness of the scheme for dynamic frequency scaling, three sets of confidential experiments were conducted: (i) without processor frequency scaling, (ii) using frequency scaling based on our proposed scheme, and (iii) frequency scaling based on a moving history-based workload prediction. The clock frequency of the processor is scaled in the range of about 200-500 MHz and in steps of about 50 MHz which corresponds to processors found in high-end PDAs. The processor has to run at a frequency to sustain an output frame rate of about 25 fps. In the absence of dynamic frequency scaling, the processor frequency is determined by this output frame rate and the maximum number of processor cycles required to process any MB.

In comparison, the scheme as described above achieves more than about 75% energy savings. Further, the scheme incurs at most about 2.7% workload prediction error as compared to around 12% in the case of moving history-based prediction schemes where the cycle requirement of a MB is predicted from the requirements of the immediately preceding MBs and at the cost of significant runtime overheads. It was found that the error increases if the prediction is done for a group of MBs, rather than for every MB. Lastly, the amount of metadata inserted in the described scheme is less than about 0.01% of the clip size when frequency scaling is done at a half-frame interval.

Figure 5:
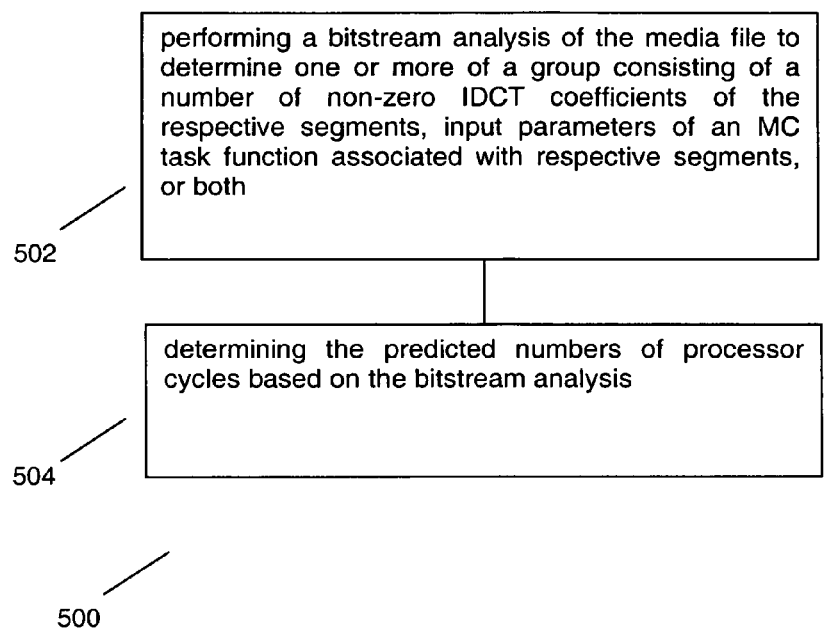
FIG. 5 shows a flow chart illustrating a method of determining predicted numbers of processor cycles required for respective segments of a media file for playback of the media file.

FIG. 5 shows a flow chart 500 illustrating a method of determining predicted numbers of processor cycles required for respective segments of a media file for playback of the media file according to an embodiment. At step 502, a bitstream analysis of the media file is performed to determine one or more of a group consisting of a number of non-zero IDCT coefficients of the respective segments, input parameters of an MC task function associated with respective segments, or both. At step 504, the predicted numbers of processor cycles is determined based on the bitstream analysis.

A method of playback of a media file according to an embodiment comprises varying a frequency and a voltage of a processor during the playback of the media file, wherein the varying is based on the method of determining predicted numbers of processor cycles required for respective segments of the media file for playback of the media file as described above.

A method of downloading a media file according to an embodiment comprises adding metadata to the media file, wherein the metadata comprises determined predicted numbers of processor cycles required for respective segments of the media file for playback of the media file based on one or more of a group consisting of a number of non-zero IDCT coefficients of the respective segments, input parameters of an MC task function associated with respective segments, or both.

Figure 6:
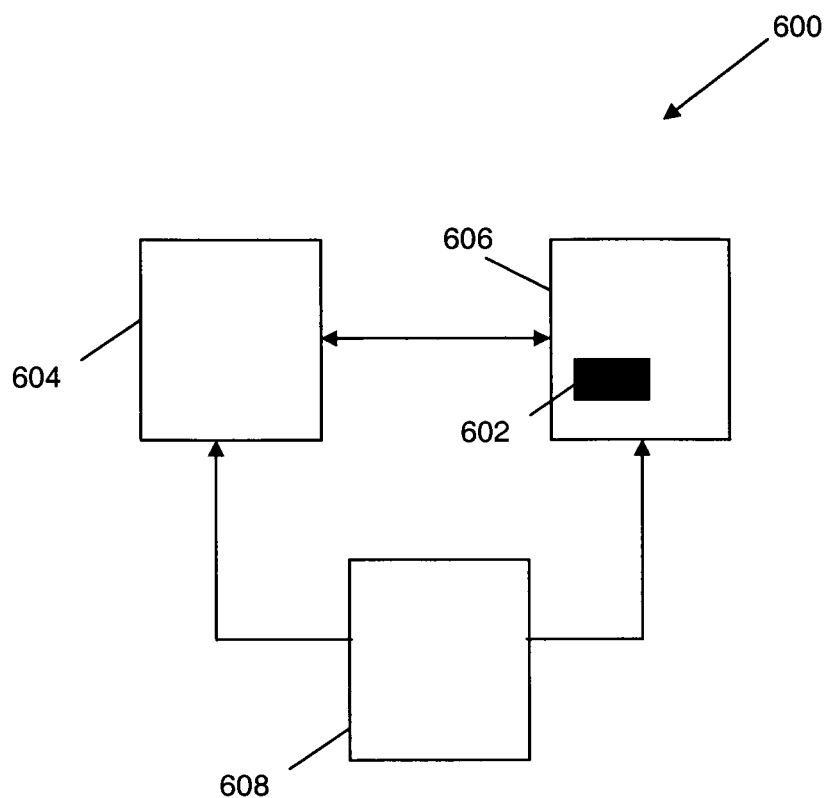
FIG. 6 shows a schematic drawing of a device for playback of a media file.

FIG. 6 shows a schematic drawing of a device 600 for playback of a media file 602 according to an embodiment. The device 600 comprises a processor 604 scalable in voltage, frequency, or both. The device 600 also comprises a database 606, coupled to the processor 604, for storing data representing a media file 602, wherein the media file 602 comprises metadata. The device 600 further comprises a controller 608, which is coupled to the processor 604 and the database 606, for controlling a frequency and a voltage during playback of the media file 602 based on the metadata.

Figure 7:
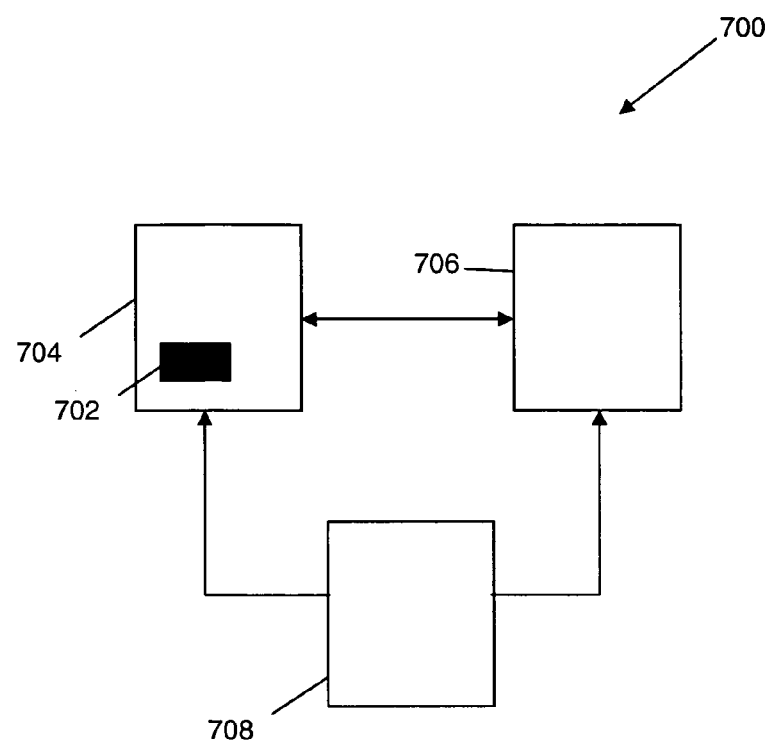
FIG. 7 shows a schematic drawing of a system for downloading a media file.

FIG. 7 shows a schematic drawing of a system 700 for downloading a media file 702 according to an embodiment. The system 700 comprises a source device 704 comprising a media file 702. The system 700 also comprises a destination device 706, coupled to the source device 704, to which the media file 702 is to be downloaded. The system 700 further comprises a processor unit 708, which is coupled to the source device 704 and the destination device 706, for generating metadata comprising determined predicted numbers of processor cycles required for respective segments of the media file for playback of the media file based on one or more of a group consisting of a number of non-zero IDCT coefficients of the respective segments, input parameters of an MC task function associated with respective segments, or both, and for adding the metadata to the media file 702 for downloading onto the destination device 706.

Figure 8:
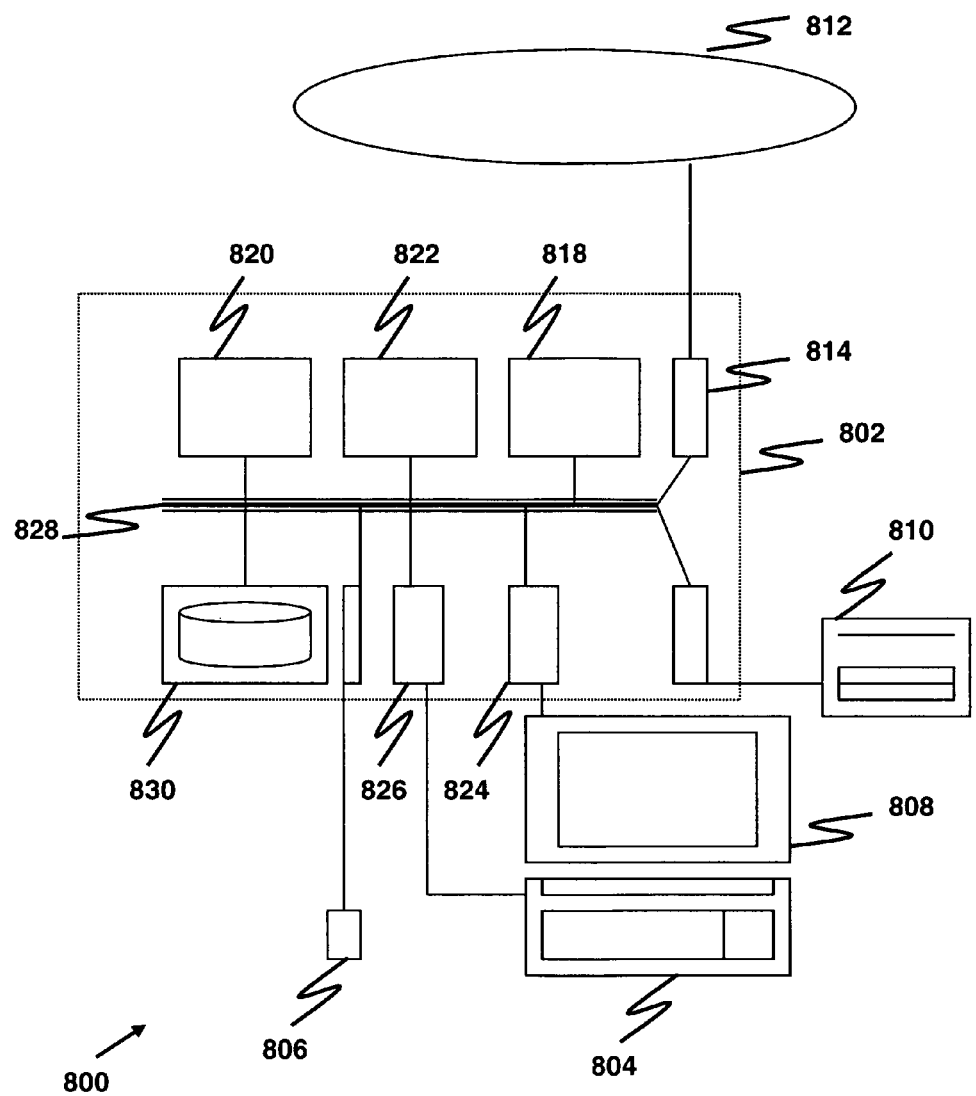
FIG. 8 shows a schematic diagram of a computer system for implementing the described methods and systems.

The method and system can be implemented on a computer system 800, schematically shown in FIG. 8. It may be implemented as software, such as a computer program being executed within the computer system 800, and instructing the computer system 800 to conduct the method of the example embodiment.

The computer system 800 comprises a computer module 802, input modules such as a keyboard 804 and mouse 806 and a plurality of output devices such as a display 808, and printer 810.

The computer module 802 is connected to a computer network 812 via a suitable transceiver device 814, to enable access to e.g. the Internet or other network systems such as Local Area Network (LAN) or Wide Area Network (WAN).

The computer module 802 in the example includes a processor 818, a Random Access Memory (RAM) 820 and a Read Only Memory (ROM) 822. The computer module 802 also includes a number of Input/Output (I/O) interfaces, for example I/O interface 824 to the display 808, and I/O interface 826 to the keyboard 804.

The components of the computer module 802 typically communicate via an interconnected bus 828 and in a manner known to the person skilled in the relevant art.

Figure 9:
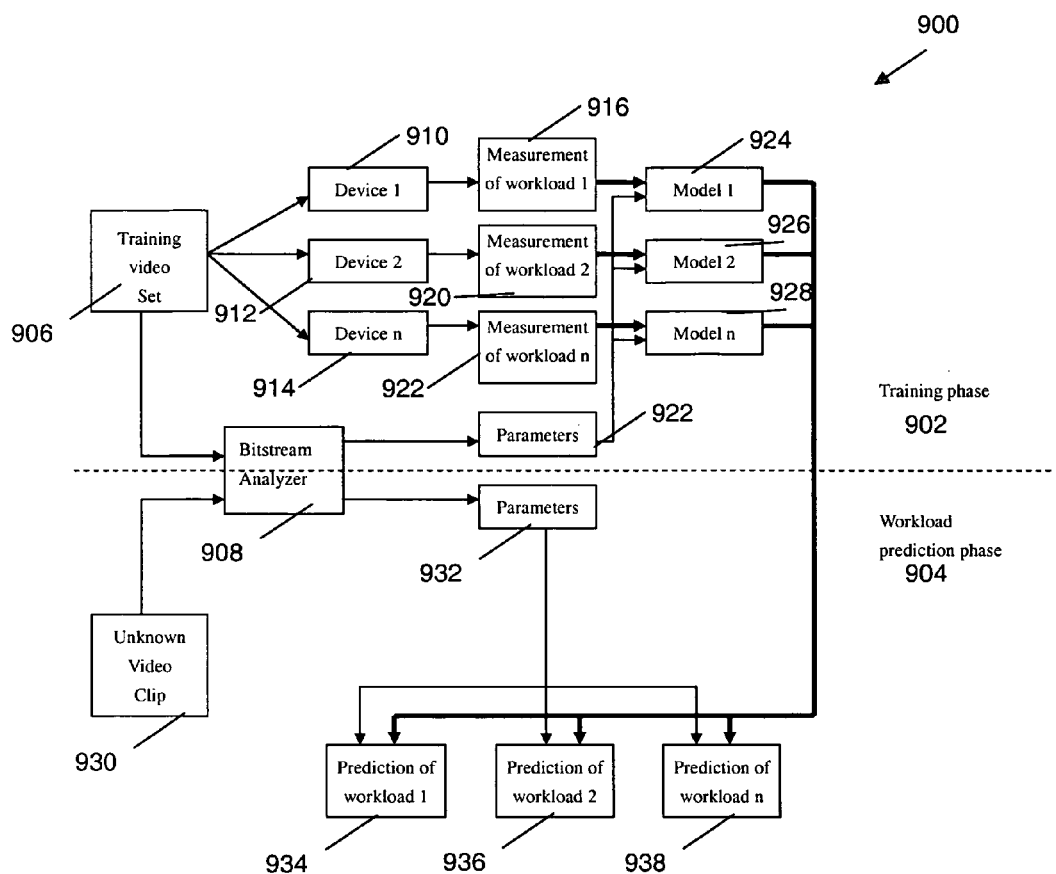
FIG. 9 shows a flowchart illustrating a training phase and a workload prediction phase.

FIG. 9 shows a flowchart 900 illustrating a training phase 902 and a workload prediction phase 904 in an example embodiment. In the training phase 902, a training video set 906 is fed into a bitstream analyzer 908 for extraction of parameters including a number of non-zero IDCT coefficients of the respective segments of the training video set 906 and input parameters of an MC task function associated with respective segments of the training video set 906, including motion mode and motion vector. As will be appreciated by a person skilled in the art, the bitstream analyzer 908 does not need to perform a complete decoding of the training video set 906. Rather, the parameters can be obtained through parsing and VLD decoding only of the bitstream of the training video set 906.

The training video set 906 is also fed into devices 910, 912, 914 for actual playback. During playback, the actual workload for the respective devices 910, 912 and 914 is measured and stored as indicated at numerals 916, 918 and 920. Based on the stored extracted parameters indicated at numeral 922, and the measured stored actual workloads, models 924, 926 and 928 are determined for the respective devices 910, 912 and 914.

In the workload prediction phase 904, an unknown video clip 930 is subjected to bitstream analysis (908), and the parameters extracted and stored as indicated at 932. Based on the extracted parameters and the models 924, 926 and 928, workload predictions are then made for the respective playback devices, as indicated at 934, 936 and 938. The described workflow can thus be used to predict the workload of unknown video clips to be downloaded into individual devices.

The application program is typically supplied to the user of the computer system 800 encoded on a data storage medium such as a CD-ROM or flash memory carrier and read utilising a corresponding data storage medium drive of a data storage device 830. The application program is read and controlled in its execution by the processor 818. Intermediate storage of program data maybe accomplished using RAM 820.

As appreciated by the person skilled in the art, the method and system can be also implemented on a laptop and a PDA.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method, comprising:
   performing, by a computing device, a bitstream analysis of a media file having a plurality of segments to determine a number of non-zero inverse discrete cosine transform (IDCT) coefficients of each of the plurality of respective segments, or input parameter values of a motion compensation (MC) task function associated with the respective segments, or both;
   determining, by the computing device, a predicted number of processor cycles for playing the media file based on a result of the bitstream analysis, including determining, for the respective segments, predicted numbers of variable length decoding (VLD) task cycles from the number of non-zero IDCT coefficients of the respective segments; and
   generating and saving in the media file at a position preceding each respective segment of the media file, by the computing device, metadata comprising the predicted number of processor cycles for each respective segment of the media file for subsequent playing of the media file, wherein a size of a segment in the plurality of segments is based on the predicted number of processor cycles for the segment.

2. The method of claim 1, wherein said determining the predicted numbers of VLD task cycles for the respective segments includes calculating the predicted numbers of VLD task cycles for the respective segments using a substantially linear relationship.

3. The method of claim 1, wherein said determining the predicted number of processor cycles includes calculating, by the computing device, predicted numbers of MC task cycles for the respective segments based on the input parameter values of the MC task function associated with each respective segment.

4. The method of claim 1, wherein said determining the predicted number of processor cycles includes calculating, by the computing device, predicted numbers of MC task cycles for the respective segments based on data parsed from each of the respective segments and a table of simulated MC tasks.

5. The method of claim 1, wherein said determining the predicted number of processor cycles includes utilizing, by the computing device, a constant number of IDCT cycles for an IDCT task in determining the predicted number of processor cycles for each of the respective segments.

6. The method of claim 1, wherein the segments comprise macroblocks, slices, or frames of the media file.

7. The method of claim 1, wherein said determining the predicted number of processor cycles includes summing, by the computing device, the predicted numbers of VLD task cycles, predicted numbers of MC task cycles, and predicted numbers of IDCT cycles.

8. The method of claim 1, wherein said determining the predicted number of processor cycles includes adding, by the computing device, a predetermined buffer cycle number to a sum of the predicted numbers of VLD task cycles, predicted numbers of MC task cycles, and predicted numbers of IDCT cycles.

9. The method of claim 1, further comprising:
   reading, by the computing device, the metadata; and
   varying, by the computing device, a frequency or a voltage of a processor of the computing device during the playing of the media file based on the predicted number of processor cycles for playing each segment of the media file as included in the metadata.

10. An apparatus, comprising:
    a processor;
    a memory coupled to the processor, and having stored therein a plurality of programming instructions configured to enable the apparatus, in response to execution of the instructions by the processor, to:
      perform a bitstream analysis of a media file having a plurality of segments to determine a number of non-zero inverse discrete cosine transform (IDCT) coefficients of each of the plurality of respective segments, or input parameter values of a motion compensation (MC) task function associated with the respective segments, or both;
      determine a predicted number of processor cycles for playing the media file based on a result of the bitstream analysis, including determination for the respective segments, of predicted numbers of variable length decoding (VLD) task cycles from the number of non-zero IDCT coefficients of the respective segments; and
      generate and save, in the media file at a position preceding each respective segment of the media file, metadata comprising the predicted number of processor cycles for each respective segment of the media file for subsequent playing of the media file, wherein a size of a segment in the plurality of segments is based on the predicted number of processor cycles for the segment.

11. The apparatus of claim 10, wherein the instructions are further configured to enable the apparatus, in response to execution of the instructions by the processor, to calculate, as part of the determination of a predicted number of processor cycles for playing the media file, predicted numbers of MC task cycles for the respective segments based on the input parameter values of the MC task function associated with each respective segment.

12. The apparatus of claim 10, wherein the instructions are further configured to enable the apparatus, in response to execution of the instructions by the processor, to calculate, as part of the determination of a predicted number of processor cycles for playing the media file, predicted numbers of MC task cycles for the respective segments, based on data parsed from each of the respective segments and a table of simulated MC tasks.

13. The apparatus of claim 10, wherein the instructions are further configured to enable the apparatus, in response to execution of the instructions by the processor, to utilize, as part of the determination of a predicted number of processor cycles for playing the media file, a constant number of IDCT cycles for an IDCT task in determining the predicted number of processor cycles for each of the respective segments.

14. The apparatus of claim 10, wherein the instructions are further configured to enable the apparatus, in response to execution of the instructions by the processor, to sum, as part of the determination of a predicted number of processor cycles for playing the media file, the predicted numbers of VLD task cycles, predicted numbers of MC task cycles, and predicted numbers of IDCT cycles.

15. The apparatus of claim 10, wherein the instructions are further configured to enable the apparatus, in response to execution of the instructions by the processor, to add, as part of the determination of a predicted number of processor cycles for playing the media file, a predetermined buffer cycle number to a sum of the predicted numbers of VLD task cycles, predicted numbers of MC task cycles, and predicted numbers of IDCT cycles.

16. The apparatus of claim 10, wherein the processor is configured to be operable in a plurality of frequencies, a plurality of voltages or both, and wherein the instructions are further configured to enable the apparatus, in response to execution of the instructions by the processor, to read the metadata and vary a frequency or a voltage of the processor during a play of the media file, based on the predicted number of processor cycles to play each segment of the media file as included in the metadata.

17. An article of manufacture, comprising:
a tangible, non-transitory computer-readable storage medium; and
a plurality of programming instructions stored in the storage medium, and configured to enable an apparatus, in response to execution of the instructions by the apparatus, to perform a number of operations, including:
performing a bitstream analysis of a media file having a plurality of segments to determine a number of non-zero inverse discrete cosine transform (IDCT) coefficients of each of the plurality of respective segments, or input parameter values of a motion compensation (MC) task function associated with the respective segments, or both;
determining a predicted number of processor cycles for playing the media file based on a result of the bitstream analysis, including determining, for the respective segments, predicted numbers of variable length decoding (VLD) task cycles from the number of non-zero IDCT coefficients of the respective segments; and
generating and saving in the media file at a position preceding each respective segment of the media file, metadata comprising the predicted number of processor cycles for each respective segment of the media file for subsequent playing of the media file, wherein a size of a segment in the plurality of segments is based on the predicted number of processor cycles for the segment.

18. The article of claim 17, wherein said determining the predicted number of processor cycles operation includes:
calculating predicted numbers of MC task cycles for the respective segments, based on the input parameters of the MC task function;
calculating predicted numbers of MC task cycles for the respective segments, based on data parsed from each of the respective segments and a table of simulated MC tasks, or
utilizing a constant number of IDCT cycles for an IDCT task.

19. The article as claimed in claim 17, wherein said determining the predicted number of processor cycles operation includes:
summing predicted numbers of VLD task cycles, predicted numbers of MC task cycles, and predicted numbers of IDCT cycles; or
adding a predetermined buffer cycle number to a sum of predicted numbers of VLD task cycles, predicted numbers of MC task cycles, or predicted numbers of IDCT cycles.

* * * * *

UNITED STATES PATENT AND TRADEMARK OFFICE
CERTIFICATE OF CORRECTION

PATENT NO. : 8,503,525 B2
APPLICATION NO. : 12/084443
DATED : August 6, 2013
INVENTOR(S) : Wang et al.

It is certified that error appears in the above-identified patent and that said Letters Patent is hereby corrected as shown below:

On the Title Page, in Item (56), under "OTHER PUBLICATIONS", in Column 2, Line 1, delete "Contraints" and insert -- Constraints --, therefor.

On Title Page 2, in Item (56), under "OTHER PUBLICATIONS", in Column 1, Line 15, delete "Algoithm" and insert -- Algorithm --, therefor.

Figure 2:
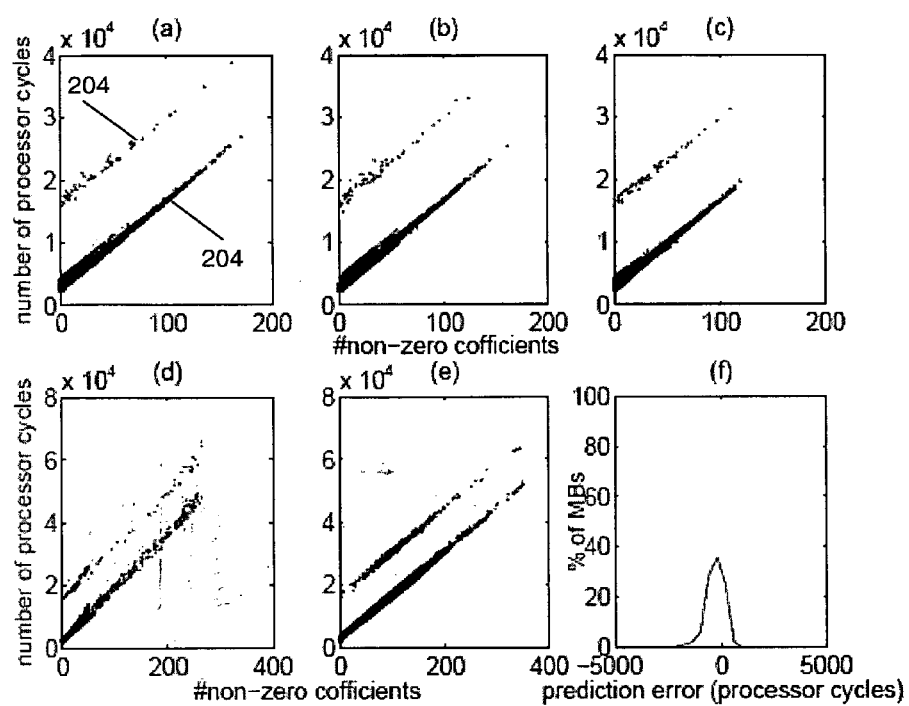
FIGS. 2(a)-(e) show plots of number of processor cycles required by a variable length decoding (VLD) task against number of non-zero coefficients.
FIG. 2(f) shows a plot of a percentage of macroblocks (MBs) against prediction error in the number of processor cycles for a FLWR video clip for VLD task.

In the Drawings:

In Fig. 2, Sheet 2 of 9, delete " 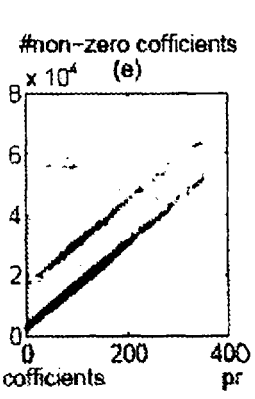 " and insert -- 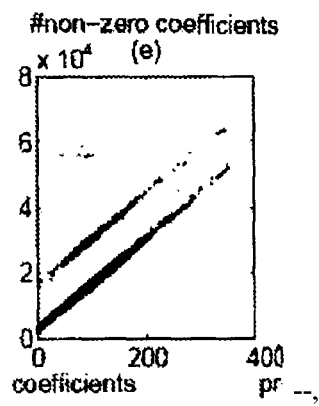 --, therefor.

In Fig. 9, Sheet 9 of 9, delete Tag "920" and insert Tag -- 918 --, therefor.

In Fig. 9, Sheet 9 of 9, delete Tag "922" and insert Tag -- 920 --, therefor.

In the Specification:

In Column 3, Line 45, delete "FIG. 3(a)-(e) shows" and insert -- FIGS. 3(a)-(e) show --, therefor.

In Column 3, Line 52, delete "FIG. 4(a)-(e) shows" and insert -- FIGS. 4(a)-(e) show --, therefor.

Signed and Sealed this
Fifteenth Day of April, 2014

Michelle K. Lee
*Deputy Director of the United States Patent and Trademark Office*

CERTIFICATE OF CORRECTION (continued)
U.S. Pat. No. 8,503,525 B2

In Column 5, Line 65, delete "Firstly;" and insert -- Firstly, --, therefor.

In Column 7, Line 63, delete "FIG. 3(a)-(e) shows" and insert -- FIGS. 3(a)-(e) show --, therefor.

In Column 8, Line 25, delete "HALFPIXEL," and insert -- HALF-PIXEL, --, therefor.

In Column 8, Line 67, delete "FIG. 4(a)-(e) shows" and insert -- FIGS. 4(a)-(e) show --, therefor.

In Column 11, Line 25, delete "maybe" and insert -- may be --, therefor.

In the Claims:

In Column 12, Line 50, in Claim 10, delete "determination" and insert -- determination, --, therefor.

UNITED STATES PATENT AND TRADEMARK OFFICE
CERTIFICATE OF CORRECTION

PATENT NO.       : 8,503,525 B2                                                                Page 1 of 1
APPLICATION NO. : 12/084443
DATED            : August 6, 2013
INVENTOR(S)      : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1389 days.

Signed and Sealed this
Fifteenth Day of September, 2015

Michelle K. Lee
*Director of the United States Patent and Trademark Office*